(12) United States Patent
Ur-Rehman et al.

(10) Patent No.: US 11,672,257 B2
(45) Date of Patent: *Jun. 13, 2023

(54) METHODS FOR MAKING HIGH-PROTEIN GREEK YOGURT USING MEMBRANE SYSTEMS BEFORE AND AFTER FERMENTATION

(71) Applicant: fairlife, LLC, Chicago, IL (US)

(72) Inventors: Shakeel Ur-Rehman, Naperville, IL (US); Timothy Peter Doelman, Glencoe, IL (US)

(73) Assignee: fairlife, LLC, Chicago, IL (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/337,712

(22) Filed: Jun. 3, 2021

(65) Prior Publication Data
US 2021/0289803 A1 Sep. 23, 2021

Related U.S. Application Data

(63) Continuation of application No. 16/052,789, filed on Aug. 2, 2018, now Pat. No. 11,051,526.

(60) Provisional application No. 62/543,414, filed on Aug. 10, 2017.

(51) Int. Cl.
| | | |
|---|---|---|
| *A23C 9/142* | (2006.01) | |
| *A23C 9/15* | (2006.01) | |
| *A23C 9/123* | (2006.01) | |
| *A23C 3/02* | (2006.01) | |
| *A23C 9/13* | (2006.01) | |

(52) U.S. Cl.
CPC .............. *A23C 9/1422* (2013.01); *A23C 3/02* (2013.01); *A23C 9/123* (2013.01); *A23C 9/1234* (2013.01); *A23C 9/1307* (2013.01); *A23C 9/1322* (2013.01); *A23C 9/1425* (2013.01); *A23C 9/15* (2013.01); *A23C 2210/252* (2013.01); *A23C 2260/05* (2013.01)

(58) Field of Classification Search
CPC ......... A23C 9/1422; A23C 3/02; A23C 9/123; A23C 9/1234; A23C 9/1307; A23C 9/1322; A23C 9/1425; A23C 9/15; A23C 2210/252; A23C 2260/05
USPC ........ 426/34, 41, 42, 43, 580, 583, 490, 491
See application file for complete search history.

(56) References Cited

U.S. PATENT DOCUMENTS

| | | |
|---|---|---|
| 4,376,126 A | 3/1983 | Evers |
| 5,145,697 A | 9/1992 | Cajigas |
| 7,169,428 B2 | 1/2007 | Dunker et al. |
| 9,510,606 B2 | 12/2016 | Ur-Rehman et al. |
| 9,538,770 B2 | 1/2017 | Ur-Rehman et al. |
| 11,051,526 B2 | 7/2021 | Ur-Rehman et al. |
| 2010/0297294 A1 | 11/2010 | Ur-Rehman et al. |
| 2013/0156889 A1 | 6/2013 | Schroeder et al. |
| 2015/0118360 A1 | 4/2015 | Ward et al. |
| 2015/0342208 A1 | 12/2015 | Bunce et al. |
| 2016/0353760 A1 | 12/2016 | Ur-Rehman et al. |
| 2018/0014550 A1 | 1/2018 | Hoffmann |

FOREIGN PATENT DOCUMENTS

| | | |
|---|---|---|
| CN | 105010530 A | 5/2015 |
| EP | 3 053 444 | 8/2016 |
| EP | 3 664 624 B1 | 6/2021 |
| JP | 2005318855 A | 11/2005 |
| JP | 2013212095 A | 10/2013 |
| WO | WO2014114970 A1 | 7/2014 |
| WO | WO 2017/103336 | 6/2017 |
| WO | WO 2019/032365 A1 | 2/2019 |

OTHER PUBLICATIONS

Uduwerella et al., entitled "Preconcentration of Yoghurt Base by Ultrafiltration for Reduction in Acid Whey Generation During Greek Yoghurt Manufacturing," International Journal of Dairy Technology, vol. 71, No. 1, Feb. 2018, pp. 71-80.
Greek Yoghurt, a Vibrant and Growing Landscape, 2014, 3 pages.
International Search Report and the Written Opinion of the International Searching Authority in PCT/US2018/044959 dated Oct. 30, 2018, 18 pages.
Kilara et al., entitled "Greek-style yogurt and related products," Manufacturing Yogurt and Fermented Milks, $2^{nd}$ Edition, Chpt 13, Jan. 2013, pp. 297-318.
B. Özer, entitled "Production of Concentrated Products," Fermented Milks, Blackwell Science Ltd., Jan. 2006, pp. 128-155.
Özer et al., entitled "The Behaviour of Starter Cultures in Concentrated Yoghurt (Labneh) Produced by Different Techniques," LWT-Food Science and Technology, vol. 32, No. 7, Nov. 1999, pp. 391-395.
Shakeel Ur-Rehman, Ph.D. "Declaration of Shakeel Ur-Rehman, Ph.D." Sep. 2, 2020, pp. 1-2.
Cohen, Y., Novel Ceramic-Polymer Composite Membranes for the Separation of Liquid Waste, 2000, Final Report U.S. Department of Energy, Project No. 54926, Grant No. DE-FG07-96ER14715.
Vatai et al., Ultrafiltration of oil-in-water emulsion: Comparison of ceramic and polymeric membranes, 2015, Corvinus University of Budapest, Faculty of Food Science, Dept. of Food Engineering, /manuscript/.
HFK-131 Food & Dairy UF Spiral Elements, Koch Membrane Systems, Rev 15-1, 2 pages (2015).
Gaucheron, "Milk and Dairy Products: A Unique Micronutrient Combination," Journal of the American College of Nutrition, 2011, vol. 30, No. 5, 400S-409S.
Le et al., "Membrane separations in dairy processing." Journal of Food Research and Technology, 2014, vol. 2, Issue 1, pp. 1-14.

(Continued)

*Primary Examiner* — Leslie A Wong
(74) *Attorney, Agent, or Firm* — Merchant & Gould P.C.

(57) ABSTRACT

Disclosed are processes for producing high protein, Greek yogurt products. Such processes can include a step of concentrating a skim milk product to produce a protein-enriched milk fraction, which then can be combined with one or more additional milk fractions to form a yogurt base. The yogurt base is inoculated with a yogurt culture and fermented, and at least a portion of the acid whey is removed from the fermented product using a ceramic ultrafiltration membrane system to form the Greek yogurt product.

32 Claims, 2 Drawing Sheets

(56) References Cited

OTHER PUBLICATIONS

Robinson et al., "Manufacture of Yoghurt," Fermented Milks (Edited by Tamime), Blackwell Science Ltd., Jan. 2006, Chapter 3, pp. 53-74.

Uduwerella, "A Novel Strategy for Minimizing Acid Whey Generation during Greek Yoghurt Production," Master's Thesis of Uduwerella, Victoria University, 2017, 137 pages.

Uduwerella et al., "Minimising generation of acid whey during Greek yoghurt manufacturing," Journal of Dairy Research, 2017, 84, 346-354.

Adriana Paredes Valencia, "Etude comparative de deux methodes de fabrication de yogourt grec a echelle pilote utilisant l'ultrafiltration comme technique de concentration," Master's Thesis of Valencia, Université Laval, 2016, 95 pages.

11,672,257 B2

METHODS FOR MAKING HIGH-PROTEIN GREEK YOGURT USING MEMBRANE SYSTEMS BEFORE AND AFTER FERMENTATION

REFERENCE TO RELATED APPLICATION

This application is a continuation application of co-pending U.S. patent application Ser. No. 16/052,789, filed on Aug. 2, 2018, now U.S. Pat. No. 11,051,526, which claims the benefit of U.S. Provisional Application Ser. No. 62/543,414, filed on Aug. 10, 2017, the disclosures of which are incorporated herein by reference in their entirety.

BACKGROUND OF THE INVENTION

Yogurt is made by adding bacterial cultures to warm milk, followed by fermentation. During fermentation, lactose in the milk is converted into lactic acid, resulting in a specific texture and flavor. Greek yogurt is a concentrated form of yogurt, in which a part of a water-rich fraction in the form of whey is removed. Greek yogurt, therefore, has higher protein content than regular yogurt, and since some of the lactose also goes with the whey, Greek yogurt also has a lower lactose/carbohydrate content than regular yogurt.

Traditionally, Greek yogurt was manufactured by fermenting milk into a curd called yogurt, followed by straining the whey from the curd in cloth bags. Straining of whey from the curd helped to concentrate the solids and increase the consistency. The process was slow and manual with some food safety concerns due to its unhygienic nature.

The present invention is generally directed to improved processes for the manufacture of high-protein, Greek-style yogurt products.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Methods for making a yogurt product are disclosed herein. In accordance with an aspect of this invention, one such method can comprise (a) concentrating a skim milk product to produce a protein-enriched milk fraction containing from about 3.5 to about 6 wt. % protein, (b) combining the protein-enriched milk fraction with an additional milk fraction to produce a standardized yogurt base containing from about 3.5 to about 6 wt. % protein, (c) inoculating the standardized yogurt base with a yogurt culture and fermenting the inoculated yogurt base to produce a fermented product, and (d) removing (or separating) at least a portion of acid whey from the fermented product to form the yogurt product. In aspects of this invention, the step of removing (or separating) at least a portion of the acid whey from the fermented product can comprise ultrafiltering the fermented product, for instance, using a ceramic membrane system.

In another aspect, a method for making a yogurt product is disclosed, and in this aspect, the method can comprise (i) concentrating a skim milk product to produce a standardized yogurt base containing from about 3.5 to about 6 wt. % protein, (ii) inoculating the standardized yogurt base with a yogurt culture and fermenting the inoculated yogurt base to produce a fermented product, and (iii) removing (or separating) at least a portion of acid whey from the fermented product to form the yogurt product. As above, removing or separating the acid whey can employ a ceramic ultrafiltration system.

Unexpectedly, and beneficially, these methods result in an excellent Greek yogurt product, and with the flexibility to increase the protein content of the yogurt product up to 20 wt. %, or more. Further, these methods can significantly reduce the amount of acid whey (and lactose contained therein) that must be disposed of.

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

DEFINITIONS

Figure 1:
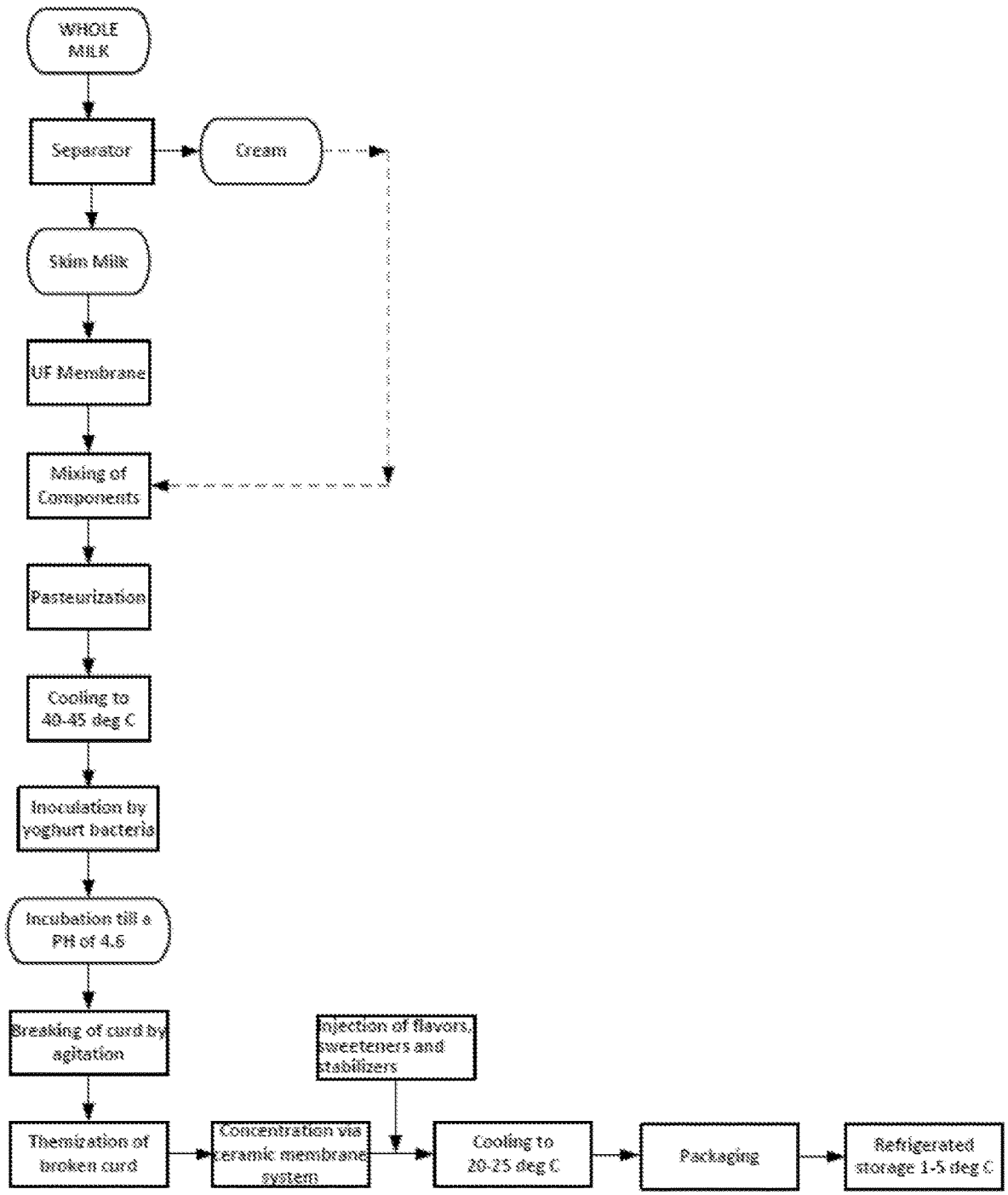
FIG. 1 presents a schematic flow diagram of a process for producing a yogurt product consistent with an aspect of this invention.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter can be described such that, within particular aspects, a combination of different features can be envisioned. For each and every aspect and each and every feature disclosed herein, all combinations that do not detrimentally affect the designs, compositions, or processes described herein are contemplated and can be interchanged, with or without explicit description of the particular combination. Accordingly, unless explicitly recited otherwise, any aspect or feature disclosed herein can be combined to describe inventive designs, compositions, or processes consistent with the present disclosure.

While compositions and processes are described herein in terms of "comprising" various components or steps, the compositions and methods can also "consist essentially of" or "consist of" the various components or steps, unless stated otherwise.

The terms "a," "an," and "the" are intended to include plural alternatives, e.g., at least one, unless otherwise specified. For instance, the disclosure of "a yogurt culture" and "an additional milk fraction" are meant to encompass one, or mixtures or combinations of more than one, yogurt culture and additional milk fraction, unless otherwise specified.

In the disclosed processes, the term "combining" encompasses the contacting of components in any order, in any manner, and for any length of time, unless otherwise specified. For example, the components can be combined by blending or mixing.

Although any methods and materials similar or equivalent to those described herein can be used in the practice or testing of the invention, the typical methods and materials are herein described.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the protein content of the yogurt product can be in certain ranges in various aspects of this invention. By a disclosure that the protein content can be in a range from about 7 to about 25 wt. %, the intent is to recite that the protein content can be any protein content within the range and, for example, can be equal to about 7, about 8, about 9, about 10, about 11, about 12, about 13, about 14, about 15, about 16, about 17, about 18, about 19, about 20, about 21, about 22, about 23, about 24, or about 25 wt. %. Additionally, the protein content can be within any range from about 7 to about 25 wt. % (for example, from about 9 to about 20 wt. %), and this also includes any combination of ranges between about 7 and about 25 wt. % (for example, the protein content can be in a range from about 7 to about 12 wt. %, or from about 15 to about 22 wt. %). Further, in all instances, where "about" a particular value is disclosed, then that value itself is disclosed. Thus, the disclosure of a protein content from about 7 to about 25 wt. % also discloses a protein content from 7 to 25 wt. % (for example, from 9 to 20 wt. %), and this also includes any combination of ranges between 7 and 25 wt. % (for example, the protein content can be in a range from 7 to 12 wt. %, or from 15 to 22 wt. %). Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Methods for making yogurt products are disclosed and described herein. These methods can be used to make, for example, high protein, Greek yogurt products with excellent taste and refrigerated shelf-stability, but with reduced levels of acid whey that must be removed to form the final yogurt product.

The methods disclosed herein use a specific concentration step to form the yogurt base prior to fermentation, and a specific acid whey removal step after fermentation. One potential benefit to these methods is a reduction in the fermentation time needed to form the fermented product. Another potential benefit is a more efficient removal of acid whey from the fermented product. Whey can be removed from the fermented product by mechanical centrifugal separators or by filtering through special membranes. Mechanical means can perform the separation based on differences in density. Centrifugal means can perform mechanical separation by applying centrifugal force. Use of mechanical separators to remove whey can result in the loss of some whey proteins, and puts a limitation on the protein content that can be achieved.

Filtration technologies (e.g., microfiltration, ultrafiltration, nanofiltration, and reverse osmosis) separate or concentrate components in mixtures—such as milk—by passing the mixture through a membrane system (or selective barrier) under a suitable pressure. The concentration/separation is, therefore, based on molecular size. The stream that is retained on by the membrane is called the retentate (or concentrate). The stream that passes through the pores of the membrane is called the permeate. As an example, the pore size of ultrafiltration membranes typically varies from 0.01 to 0.1 microns. In the dairy industry, the ultrafiltration membranes often are identified based on molecular weight cut-off (MWCO), rather than pore size. The molecular weight cut-off for ultrafiltration membranes can vary from 1000-100,000 Daltons.

As it pertains to the methods disclosed herein, and beneficially, ultrafiltration (and other membrane technologies) can be used to concentrate protein in the retentate to produce a higher-protein yogurt base, and if desired, a higher-protein yogurt product. Also beneficially, ultrafiltration (and other membrane technologies) can be used to remove the acid whey from the fermented product to result in the yogurt product. The amount of acid whey that must be removed can be reduced due to the higher-protein content of the yogurt base.

Reconstituted milk protein powders can be used to increase the protein content in Greek yogurt, but that results in poor taste of the final product, due to the longer fermentation time from yogurt bacteria inoculation until the yogurt curd is formed, and due to nature of dry protein powders. Moreover, the solubility of milk protein powders has its own challenges. Further, simply concentrating milk to the Greek yogurt solids level, followed by bacterial inoculation of the concentrated milk to get the desired acidity of Greek yogurt, results in long fermentation time and the poor product taste. It is believed that the methods disclosed herein overcome these deficiencies.

Methods for Making Yogurt Products

In one aspect, a method for making a yogurt product is provided, and in this aspect, the method can comprise (or consist essentially of, or consist of) (a) concentrating a skim milk product to produce a protein-enriched milk fraction containing from about 3.5 to about 6 wt. % protein, (b) combining the protein-enriched milk fraction with an additional milk fraction to produce a standardized yogurt base containing from about 3.5 to about 6 wt. % protein, (c) inoculating the standardized yogurt base with a yogurt culture and fermenting the inoculated yogurt base to produce a fermented product, and (d) removing (or separating) at least a portion of acid whey from the fermented product to form the yogurt product. In another aspect, a method for making a yogurt product is provided, and in this aspect, the method can comprise (or consist essentially of, or consist of) (i) concentrating a skim milk product to produce a standardized yogurt base containing from about 3.5 to about 6 wt. % protein, (ii) inoculating the standardized yogurt base with a yogurt culture and fermenting the inoculated yogurt base to produce a fermented product, and (iii) removing (or separating) at least a portion of acid whey from the fermented product to form the yogurt product.

Generally, the features of the methods (e.g., the characteristics of the skim milk product or yogurt base, the amount and type of the yogurt culture, the techniques used for the concentrating and removing steps, the amount of acid whey removed, and the characteristics of the yogurt product, among others) are independently described herein and these features can be combined in any combination to further describe the disclosed methods. Moreover, other process steps can be conducted before, during, and/or after any of the steps listed in the disclosed methods, unless stated otherwise. Additionally, the yogurt products (e.g., high protein Greek yogurts, ready for consumption) produced in accordance with any of the disclosed methods are within the scope of this disclosure and are encompassed herein.

The skim milk product in step (a) and step (i) can have suitable amounts of lactose (or milk sugar), protein, fat, minerals, and solids. For example, the skim milk product can have less than or equal to about 0.5 wt. % fat, less than or equal to about 0.25 wt. % fat, or less than or equal to about 0.15 wt. % fat. The protein content of the skim milk product often ranges from about 3 to about 4 wt. %, the lactose content often ranges from about 4 to about 6 wt. %, the mineral content often ranges from about 0.5 to about 0.9 wt. %, and the solids content often ranges from about 8 to about 11 wt. %, although other appropriate ranges for these milk components are readily apparent from this disclosure.

Before step (a) and step (i), the skim milk product can be produced using any suitable technique, an example of which is separating (e.g., centrifugally separating) a fresh or raw milk product into the skim milk product and cream. The fresh or raw milk product can be cow's milk, which contains approximately 87 wt. % water, 3-4 wt. % protein, 4-5 wt. % carbohydrates/lactose, 3-4 wt. % fat, and 0.3-0.8 wt. % minerals. When the fresh or raw milk product is separated into the skim milk product and cream, the cream fraction typically contains high levels of fat (e.g., 20-50 wt. % fat, or 30-50 wt. % fat) and solids (e.g., 30-60 wt. %, or 40-55 wt. %), and often contains approximately 1.5-3.5 wt. % protein, 2-5 wt. % lactose, and 0.2-0.9 wt. % minerals, although not limited thereto.

In step (a), the skim milk product can be concentrated to produce a protein-enriched milk fraction containing from about 3.5 to about 6 wt. % protein, while in step (i) the skim milk product can be concentrated to produce a standardized yogurt base containing from about 3.5 to about 6 wt. % protein. While not being limited thereto, the concentration steps can be conducted at a temperature in a range from about 3 to about 15° C., and more often from about 3 to about 10° C., or from about 5 to about 8° C. In one aspect, the steps of concentrating the skim milk product can comprise ultrafiltering the skim milk product. For instance, the skim milk product can be ultrafiltered using a polymeric membrane system. The polymeric membrane system can be configured with pore sizes such that the materials having molecular weights greater than about 1,000 Daltons, greater than about 5,000 Daltons, or greater than about 10,000 Daltons, are retained, while lower molecular weight species pass through. In some aspects, ultrafiltration utilizes a membrane system having pore sizes in a range from about 0.01 to about 0.1 µm, and operating pressures typically in the 45-150 psig range.

In another aspect, the steps of concentrating the skim milk product can comprise nanofiltering the skim milk product. Generally, nanofiltration utilizes a membrane system having pore sizes in a range from about 0.001 to about 0.01 µm. Operating pressures typically are in the 150-450 psig range.

In another aspect, the steps of concentrating the skim milk product can comprise microfiltering the skim milk product. Generally, microfiltration utilizes a membrane system having pore sizes in a range from about 0.1 to about 0.2 µm. Operating pressures typically are below about 75 psig.

In another aspect, the steps of concentrating the skim milk product can comprise diafiltering the skim milk product. Generally, the diafiltration step is performed using ultrafiltration membranes, such as described herein: materials with molecular weights greater than about 1,000 Daltons, greater than about 5,000 Daltons, or greater than about 10,000 Daltons, typically are retained, while lower molecular weight species pass through. The membrane system can have pore sizes in a range from about 0.01 to about 0.1 µm, and operating pressures typically in the 45-150 psig range. Often, diafiltering the skim milk product can comprise diafiltering a mixture of the skim milk product and water, but is not limited thereto, and at any suitable weight ratio of the water to the skim milk product (e.g., from about 0.1:1 to about 1:1), and at any suitable concentration factor (e.g., from about 1.2 to about 5).

In yet another aspect, the steps of concentrating the skim milk product can comprise subjecting the skim milk product to reverse osmosis. Reverse osmosis is a tight filtration process in which substantially all the milk components are retained, and only water passes through. Generally, reverse osmosis utilizes a membrane system having pore sizes of less than or equal to about 0.001 µm. Operating pressures typically are in the 450-600 psig range.

In yet another aspect, the steps of concentrating the skim milk product can comprise subjecting the skim milk product to forward osmosis. Forward osmosis is typically performed at lower pressures than standard reverse osmosis, and utilizes a semi-permeable membrane system having pore sizes such that water passes through, while other materials (e.g., proteins, fats, lactose or other sugars, and minerals) do not. Operating pressures typically range from about 0 psig (atmospheric pressure) to about 50 psig, from about 0 psig to about 10 psig, from about 1 psig to about 50 psig, from about 1 psig to about 30 psig, from about 1 psig to about 10 psig, from about 10 psig to about 30 psig, from about 15 to about 25 psig, and the like. While not being limited thereto, forward osmosis membrane systems have a molecular weight cutoff of much less than 100 Da and, therefore, components other than water can be concentrated in the forward osmosis process. Generally, forward osmosis comprises a membrane system having pore sizes of less than or equal to about 0.001 µm. Any suitable draw solution that has a higher concentration of solutes or ions than the solution from which water is to be drawn through a semipermeable membrane can be used for the forward osmosis step.

In still another aspect, the steps of concentrating the skim milk product can comprise condensing the skim milk product under reduced pressure. Reduced pressure encompasses any suitable sub-atmospheric pressure, and typically involves the use of a vacuum system or apparatus. Elevated temperatures can be employed during the condensing step, but this is not a requirement.

Regardless of the concentrating technique that is utilized, the protein content of the protein-enriched milk fraction (step (a)) and the standardized yogurt base (step (i)) increases, as compared to that of the skim milk product, and generally falls within the range from about 3.5 to about 6 wt. % protein. In some aspects, the amount of protein in the protein-enriched milk fraction (step (a)) and the standardized yogurt base (step (i)), independently, can be in a range from about 3.8 to about 5.5 wt. % protein; alternatively, from about 3.7 to about 5 wt. % protein; alternatively, from about 3.7 to about 4.5 wt. % protein; alternatively, from about 4 to about 5.2 wt. % protein; or alternatively, from about 4.1 to about 4.8 wt. % protein. Other appropriate ranges for the amount of protein in the protein-enriched milk fraction (step (a)) and/or in the standardized yogurt base (step (i)) are readily apparent from this disclosure.

Likewise, the percent solids of the protein-enriched milk fraction (step (a)) and the standardized yogurt base (step (i)) can increase, as compared to that of the skim milk product, due to the concentration process. The solids contents can fall within a range from about 9 to about 20 wt. %, from about 9.5 to about 15 wt. %, from about 10 to about 14 wt. %, or from about 10 to about 12 wt. %, although not being limited thereto. The protein-enriched milk fraction (step (a)) and the standardized yogurt base (step (i)) often can contain less than or equal to about 0.5 wt. % fat, less than or equal to about 0.25 wt. % fat, or less than or equal to about 0.15 wt. % fat, as well as a typical lactose content from about 4 to about 6 wt. %, and a typical mineral content from about 0.7 to about 1.3 wt. %, or from about 0.85 to about 1.2 wt. %.

In step (b) of the first method for making a yogurt product, the protein-enriched milk fraction can be combined with an additional milk fraction to produce a standardized yogurt base containing from about 3.5 to about 6 wt. % protein. The standardized yogurt base of step (b) can have generally the same respective amounts of protein, fat, lactose, minerals, and solids as that of the standardized yogurt base in step (i). For example, the standardized yogurt base in step (b) can contain from about 3.5 to about 6 wt. % protein, from about 3.8 to about 5.5 wt. % protein, from about 3.7 to about 5 wt. % protein, from about 3.7 to about 4.5 wt. % protein, from about 4 to about 5.2 wt. % protein, or from about 4.1 to about 4.8 wt. % protein, and have a solids content from about 9 to about 15 wt. %, from about 9.5 to about 14 wt. %, from about 10 to about 14 wt. %, or from about 10 to about 12 wt. %, although other appropriate ranges are readily apparent from this disclosure.

Any suitable additional milk fraction can be combined with the protein-enriched milk fraction to result in the standardized yogurt base. Illustrative additional milk fractions can include, but are not limited to, cream, skim milk, a lactose-rich fraction, a mineral-rich fraction, water, and the like, as well as mixtures or combinations thereof. In some aspects, the additional milk fraction can comprise skim milk, a mineral-rich fraction, or both. As an example, cream can be added to increase the fat and solids content of the standardized yogurt base (e.g., up to approximately 1-5 wt. % or 2-4 wt. % fat, and up to approximately 12-17 wt. % or 12-16 wt. % solids, although not being limited thereto). As another example, a lactose-rich fraction can be added to increase the sugar content of the standardized yogurt base. As yet another example, a mineral-rich fraction can be added to increase the mineral content of the standardized yogurt base. As still another example, skim milk can be added to increase the mineral content and/or sugar content of the standardized yogurt base. One or more than one additional milk fraction can be combined with, in any relative proportion, the protein-enriched milk fraction to produce the standardized yogurt base in step (b). A "component-rich fraction" is meant to encompass any fraction containing at least 15% more of a component of milk (protein, lactose/sugar, fat, minerals) than that found in cow's milk. For instance, a lactose-rich fraction often can contain from about 6 to about 20 wt. % sugar (i.e., in any form, such as lactose, glucose, galactose, etc.), from about 6 to about 18 wt. % sugar, or from about 7 to about 16 wt. % sugar. A mineral-rich fraction can contain from about 1 to about 20 wt. % minerals, from about 1 to about 10 wt. % minerals, or from about 1.5 to about 8 wt. % minerals. A fat-rich fraction (e.g., cream) often can contain from about 8 to about 50 wt. % fat, from about 20 to about 50 wt. % fat, or from about 30 to about 45 wt. % fat.

These component-rich milk fractions can be produced by any technique known to those of skill in the art. While not limited thereto, the component-rich milk fraction (or milk fractions) can be produced by a membrane filtration process, such as disclosed in U.S. Pat. Nos. 7,169,428, 9,510,606, and 9,538,770, which are incorporated herein by reference in their entirety. For example, fresh or raw milk can be fractionated into skim milk and cream (fat-rich fraction) by centrifugal separators. The skim milk can be fractionated via combinations of microfiltration, ultrafiltration, nanofiltration, and reverse osmosis (or forward osmosis) into a protein-rich fraction, a lactose-rich fraction, a mineral/flavor-rich fraction, and a milk water fraction. Additionally or alternatively, the component-rich milk fraction (or milk fractions) can be produced by a process comprising mixing water and a powder ingredient (e.g., protein powder, lactose powder, mineral powder, etc.).

In one aspect of this invention, the skim milk product in step (a) can be concentrated using ultrafiltration, and the resulting UF retentate can be combined with skim milk, in any suitable proportion, to form the standardized yogurt base in step (b).

In another aspect, the skim milk product in step (a) can be concentrated using diafiltration (with an ultrafiltration membrane), and the resulting DF retentate can be combined with skim milk, in any suitable proportion, to form the standardized yogurt base in step (b).

In another aspect, the skim milk product in step (a) can be concentrated using microfiltration, and the resulting MF retentate can be combined with skim milk, in any suitable proportion, to form the standardized yogurt base in step (b).

In yet another aspect, the skim milk product in step (a) can be concentrated using ultrafiltration, and the resulting UF retentate can be combined with a mineral-rich fraction, in any suitable proportion, to form the standardized yogurt base in step (b). The mineral-rich fraction can be produced using reverse osmosis, forward osmosis, or other suitable technique.

In still another aspect, the skim milk product in step (a) can be concentrated using diafiltration (with an ultrafiltration membrane), and the resulting DF retentate can be combined with a mineral-rich fraction, in any suitable proportion, to form the standardized yogurt base in step (b). The mineral-rich fraction can be produced using reverse osmosis, forward osmosis, or other suitable technique.

While not limited thereto, the standardized yogurt base can contain from about 1100 to about 1800 ppm (by weight) of calcium in one aspect, from about 1200 to about 1800 ppm in another aspect, and from about 1200 to about 1600 ppm in yet another aspect (e.g., from about 1300 to about 1400 ppm). Likewise, the standardized yogurt base can contain from about 800 to about 1200 ppm phosphorus in one aspect, from about 850 to about 1150 ppm in another aspect, and from about 800 to about 1100 ppm in yet another aspect (e.g., from about 940 to about 980 ppm). The standardized yogurt base can be characterized by a weight ratio of calcium to protein that can fall within a range from about 0.02 to about 0.04, from about 0.025 to about 0.035 ppm, or from about 0.028 to about 0.033 (e.g., from about 0.029 to about 0.032). Additionally or alternatively, the standardized yogurt base can be characterized by a weight ratio of phosphorus to protein often falling in a range from about 0.013 to about 0.033, from about 0.015 to about 0.03 ppm, or from about 0.018 to about 0.025 (e.g., from about 0.02 to about 0.023).

The pH of the standardized yogurt base is generally neutral. For instance, the pH of the standardized yogurt based can be in a range from about 6.3 to about 7.3 in one aspect, from about 6.6 to about 6.9 in another aspect, and from about 6.7 to about 7 in yet another aspect. Beneficially, the standardized yogurt base can have a calcium to phosphorus ratio and a pH level that are similar to that of the starting material (e.g., the skim milk product).

Optionally, the disclosed methods can further comprise a step of pasteurizing the standardized yogurt base between step (b) and step (c), or between step (i) and step (ii). Any suitable pasteurization conditions can be used, such as conducting the pasteurization step at a temperature in a range from about 80 to about 95° C. for a time period in a range from about 2 to about 15 minutes; or alternatively, at a temperature of approximately 90° C. for a time period in a range from about 5 to about 7 minutes.

In step (c) and step (ii), the yogurt base can be inoculated (or contacted or combined) with a yogurt culture and the inoculated yogurt base can be fermented to produce a fermented product. The yogurt base generally is inoculated and/or fermented at an elevated temperature. In one aspect, the yogurt base can be inoculated and/or fermented at a temperature in a range from about 20 to about 45° C., while in another aspect, the yogurt base can be inoculated and/or fermented at a temperature in a range from about 35 to about 45° C., and in yet another aspect, the yogurt base can be inoculated and/or fermented at a temperature in a range from about 40 to about 45° C. Other appropriate inoculation and/or fermentation temperatures are readily apparent from this disclosure.

The amount and type of the yogurt culture used can vary depending upon the desired attributes of the final yogurt product as well as the characteristics of the yogurt base. While not being limited thereto, the amount of the yogurt culture can range from about 0.0001 to about 3 wt. %, from about 0.0005 to about 0.05 wt. %, from about 0.0001 to about 0.01 wt. %, or from about 0.0005 to about 0.01 wt. %, based on the weight of the standardized yogurt base. Other appropriate ranges for the amount of the yogurt culture added to the yogurt base are readily apparent from this disclosure.

The form of the yogurt culture is not particularly limited; the yogurt culture can be bulk, freeze dried, or frozen, and mixtures or combinations can be used as well. Typical yogurt cultures that can be used include, but are not limited to, *Lactobacillus bulgaricus, Streptococcus thermophilus, Lactobacillus acidophillus, Lactobacillus casei, Lactococcus lactis, Lactococcus cremoris, Latobacillus plantarum, Bifidobacterium, Leuconostoc*, and the like, as well as any combination thereof. In some aspects, the yogurt culture can comprise *Lactobacillus bulgaricus, Streptococcus thermophilus*, or a combination thereof.

As would be readily recognized by those of skill in the art, any suitable vessel can be used for forming the fermented product, and such can be accomplished batchwise or continuously. As an example, the fermentation step can be conducted in a tank, a silo, or a vat. Any suitable period of time can be used, and this can depend upon the temperature and the amount of the yogurt culture, amongst other variables. Generally, the inoculated yogurt base can be fermented for a time period in a range from about 1 to about 18 hours, from about 2 to about 8 hours, or from about 3 to about 7 hours.

Typically, the inoculated yogurt base is fermented until the pH of the fermented product has reached a certain pH range. In some aspects, for example, the targeted pH can be in a range from about 4.3 to about 4.8, from about 4.4 to about 4.8, from about 4.4 to about 4.7, from about 4.5 to about 4.8, from about 4.5 to about 4.7, from about 4.6 to about 4.8, or from about 4.6 to about 4.7. Other appropriate ranges for the pH of the fermented product are readily apparent from this disclosure.

Optionally, the disclosed methods can further comprise a step of agitating the fermented product between step (c) and step (d), and between step (ii) and step (iii). Often, this step can be referred to as breaking of the curd. Additionally or alternatively, the disclosed methods can further comprise a step of heat treating the fermented product between step (c) and step (d), and between step (ii) and step (iii). The optional heat treating step can be performed after the agitation step and at any suitable combination of temperature and time, such as at a temperature in a range from about 55 to about 65° C. for a time period in a range from about 1 to about 3 minutes.

In step (d) and step (iii), at least a portion of acid whey from the fermented product is removed to form the yogurt product. In one aspect, removing at least a portion of the acid whey from the fermented product can comprise ultrafiltering the fermented product. While not being limited thereto, ultrafiltration of the fermented product can be conducted at a temperature in a range from about 35 to about 55° C.; alternatively, from about 40 to about 60° C.; or alternatively, from about 45 to about 55° C. In these acid whey removal steps, the fermented product can be ultrafiltered using a ceramic membrane system. The ceramic membrane system can be configured with pore sizes of less than or equal to about 0.1 μm, such that the acid whey passes through the pores, and the yogurt product is retained. While not wishing to be bound by the following theory, it is believed that a ceramic membrane system is superior to a polymeric membrane system at this stage of the process, in which a higher viscosity product (the fermented product) is ultrafiltered to retain the yogurt product. Further, a ceramic membrane system can withstand higher operating temperatures, has more cleaning options (pH range from acid to alkaline, as well as hot water sterilization at 80-90° C. for 30 to 90 min), and fouling/scale can be more easily removed by exposure to elevated temperatures.

In another aspect, the steps of removing at least a portion of the acid whey can be achieved by nanofiltering the fermented product. Generally, nanofiltration utilizes a membrane system having pore sizes in a range from about 0.001 to about 0.01 μm, and temperatures ranging from about 15 to about 45° C. often can used.

In another aspect, the steps of removing at least a portion of the acid whey can be achieved by microfiltering the fermented product. Generally, microfiltration utilizes a membrane system having pore sizes in a range from about 0.1 to about 0.2 μm, and temperatures ranging from about 35 to about 55° C. often can used.

In yet another aspect, the steps of removing at least a portion of the acid whey can be achieved by subjecting the fermented product to reverse osmosis. Generally, reverse osmosis utilizes a membrane system having pore sizes of less than or equal to about 0.001 μm, and temperatures ranging from about 15 to about 45° C. often can used.

In still another aspect, the steps of removing at least a portion of the acid whey can be achieved by subjecting the fermented product to a mechanical separation process. Often, the mechanical separation process can comprise centrifugal separation, but other suitable separations processes can be used.

Regardless of the acid whey removal technique that is utilized, a large majority of the acid whey is removed from the fermented product. In accordance with aspects of this invention, at least about 90 wt. %, at least about 92 wt. %, at least about 95 wt. %, at least about 98 wt. %, or at least about 99 wt. %, of the acid whey present in the fermented product is removed in step (d) or step (iii). The acid whey material that is removed has a very low solids content, typically characterized by a solids content of less than about 8 wt. %, less than about 7 wt. %, or less than about 6.5 wt. %.

Depending upon the characteristics of the yogurt base, the relative amounts of the yogurt product and the acid whey can vary. In one aspect, the weight ratio of the yogurt product to the acid whey in the fermented product can be in a range from about 35:65 to about 70:30. In another aspect, the weight ratio of the yogurt product to the acid whey in the fermented product can be in a range from about 40:60 to about 70:30. In yet another aspect, the weight ratio of the yogurt product to the acid whey in the fermented product can be in a range from about 45:55 to about 65:35. Other ranges for the weight ratio of the yogurt product to the acid whey in the fermented product are readily apparent from this disclosure.

The disclosed methods can further comprise a step of packaging the yogurt product in a container. Optionally, this packaging step can be performed aseptically, using any suitable aseptic filling/packaging system.

In further aspects of this invention, the disclosed methods can further comprise a step of combining the yogurt product and any suitable ingredient, and packaging in a container. Non-limiting examples of such ingredients can include a sugar/sweetener, a flavorant, a preservative (e.g., to prevent yeast or mold growth), a stabilizer, an emulsifier, a prebiotic substance, a special probiotic bacteria, a vitamin, a mineral, an omega 3 fatty acid, a phyto-sterol, an antioxidant, or a colorant, and the like, as well as any mixture or combination thereof.

Prior to packaging, the disclosed methods can further comprise a step of cooling to a suitable temperature, such as in a range from about 15 to about 25° C., from about 15 to about 21° C., or from about 15 to about 20° C. Also prior to packaging, or after packaging in a suitable container, the yogurt product can be heat treated for shelf-stability. Any suitable container can be used to package the yogurt product, such as might be used for the distribution and/or sale of yogurt products in a retail outlet. Illustrative and non-limiting examples of typical containers include a cup, a bottle, a bag, or a pouch, and the like. The container can be made from any suitable material, such as glass, metal, plastics, and the like, as well as combinations thereof.

The packaged yogurt product generally is stored at refrigerated conditions, such as in a range from about 2° C. to about 10° C., or from about 1 to about 5° C. Under refrigerated conditions (2-10° C., or 1-5° C.), the yogurt product can be shelf-stable for a time period in a range from about 30 to about 90 days; alternatively, shelf-stable for a time period of from about 30 to about 60 days; or alternatively, shelf-stable for a time period of from about 30 to about 45 days.

If desired, the methods disclosed herein can further comprise a treatment step to increase the shelf-stability of the yogurt product. Such treatment steps can include, but are not limited to, pasteurization, ultra-high temperature (UHT) sterilization, high pressure processing (HPP), and the like, as well as combinations thereof. After such treatment, the yogurt product can be shelf-stable without refrigeration (at a temperature from about 20° C. to about 25° C.) for a time period in a range from about 7 to about 180 days, from about 7 to about 120 days, from about 14 to about 120 days, or from about 30 to about 150 days.

The yogurt products of the methods disclosed herein typically can contain a relatively high amount of protein. In one aspect, the yogurt product can contain from about 7 to about 25 wt. % protein (e.g., from about 7 to about 12 wt. % protein). In another aspect, the yogurt product can contain from about 9 to about 20 wt. % protein (e.g., from about 9 to about 12 wt. % protein). In yet another aspect, the yogurt product can contain from about 8 to about 13 wt. % protein (e.g., from about 8 to about 10 wt. % protein). In still another aspect, the yogurt product can contain from about 12 to about 20 wt. % protein.

The lactose content of the yogurt product is not limited to any particular range, but often, the yogurt product can contain from about 0.5 to about 3 wt. % lactose, or from about 1 to about 2 wt. % lactose. Additionally or alternatively, the yogurt product beneficially can have a relatively high weight ratio of protein to lactose (protein:lactose), such as greater than or equal to about 4:1, greater than or equal to about 5:1, greater than or equal to about 6:1, greater than or equal to about 8:1, or greater than or equal to about 10:1. At high levels of protein content (e.g., 15-20 wt. %), the amount of lactose can be less than 1 wt. % (and approach zero); therefore, the protein:lactose ratio can be greater than 50:1, or greater than 100:1, in some aspects of this invention. In the examples that follow, the protein:lactose ratio is in the 5:1 to 6:1 range.

Further, the yogurt product can be characterized by a solids content in a range from about 10 to about 30 wt. %, from about 12 to about 20 wt. %, from about 11 to about 19 wt. %, or from about 13 to about 16 wt. %. Additionally or alternatively, the yogurt product can be characterized by a titratable acidity (% lactic acid) in a range from about 0.75 to about 2%, or from about 1 to about 1.5%. Additionally or alternatively, the yogurt product can be characterized by a fat content of less than or equal to about 0.7 wt. % fat, less than or equal to about 0.5 wt. % fat, or less than or equal to about 0.3 wt. % fat, or a fat content in a range from about 1 to about 8 wt. % fat, or from about 2 to about 7 wt. % fat. Additionally or alternatively, the yogurt product can be characterized by a mineral content from about 0.8 to about 2 wt. %, or from about 0.9 to about 1.5 wt. %.

An illustrative and non-limiting example of a suitable method for making a yogurt product consistent with aspects of this invention is shown in FIG. 1. First, fresh whole milk is separated into cream and a skim milk product. The skim milk product is then subjected to ultrafiltration, such as via a polymeric membrane system, as described herein, resulting in a retentate often referred to as the protein-enriched milk fraction. Additional milk fractions, such as cream, then can be combined with the protein-enriched milk fraction, to form a standardized yogurt base with the desired amounts of the respective milk components (e.g., protein, fat, lactose, and minerals).

In FIG. 1, the yogurt base is pasteurized and then cooled to a temperature of 40-45° C., followed by inoculating the yogurt base with a yogurt culture, and incubating (or fermenting) the inoculated yogurt base until a target pH has been reached, for example, a pH of 4.6. The resulting fermented product is subjected to agitation to break the curd, followed by a heat treatment step, typically in the 55-65° C. range. The fermented product is then subjected to ultrafiltration, such as via a ceramic membrane system, as described herein, resulting in a retentate often referred to as the yogurt product, and a permeate that contains the acid whey from the fermented product.

Flavor, sugar/sweetener, and stabilizer ingredients are combined with the yogurt product in FIG. 1, followed by cooling to 20-25° C., and packaging (e.g., aseptically) in a suitable container, such as a bottle, cup, or bag. The packaged yogurt product is generally stored at refrigerated conditions, often in the 1-5° C. range.

Figure 2:
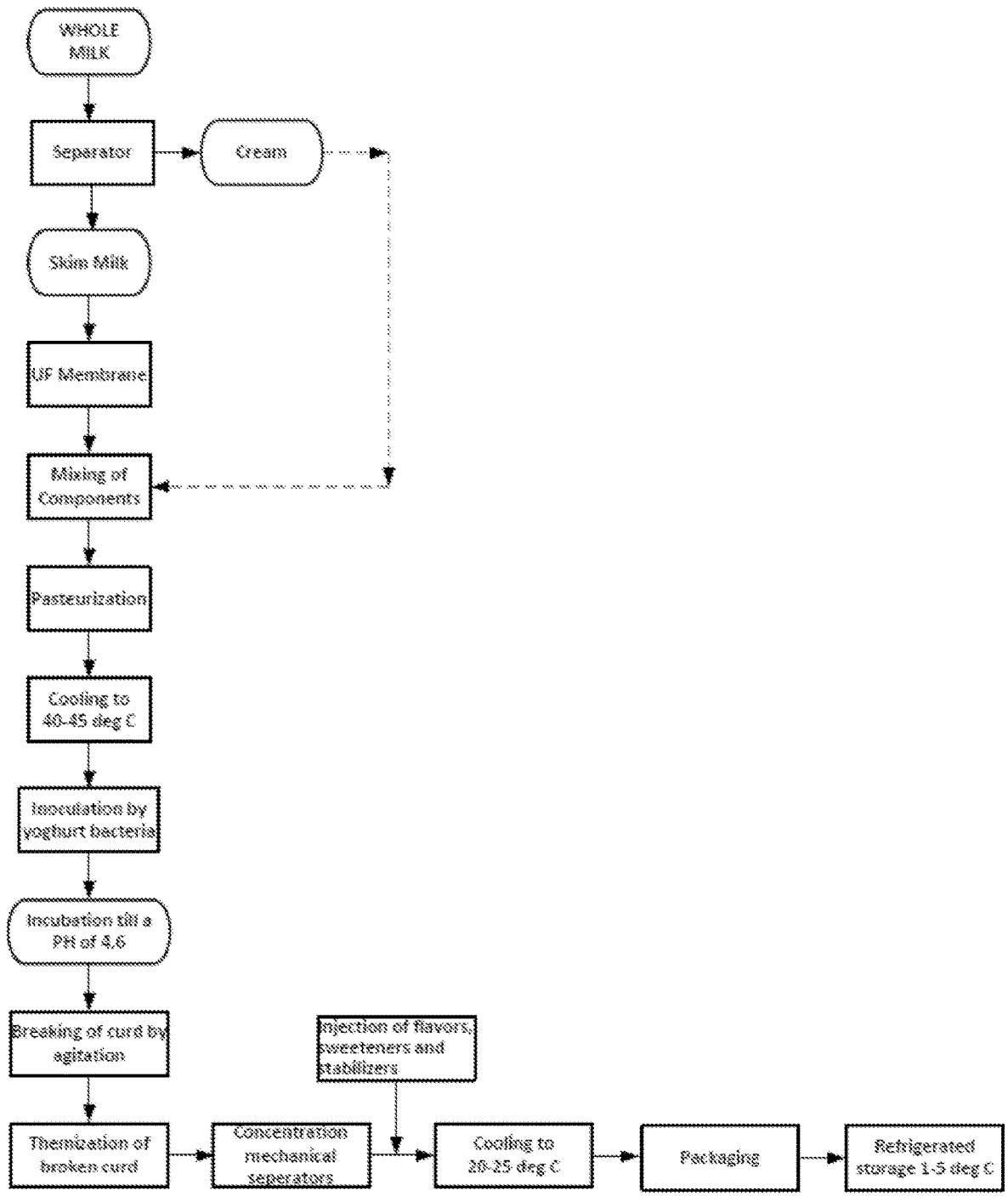
FIG. 2 presents a schematic flow diagram of a process for producing a yogurt product consistent with another aspect of this invention.

Another illustrative and non-limiting example of a suitable method for making a yogurt product consistent with aspects of this invention is shown in FIG. 2. The steps in FIG. 2 are the same as those in FIG. 1, except that the fermented product is subjected to a mechanical separation step (such as centrifugal separation, instead of ultrafiltration with a ceramic membrane system), resulting in a retentate often referred to as the yogurt product, and a permeate that contains the acid whey from the fermented product.

Examples

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

Total solids (wt. %) was determined in accordance with procedure SMEDP 15.10 C by CEM Turbo Solids and Moisture Analyzer (CEM Corporation, Matthews, N.C.). Ash is the residue remaining after ignition in a suitable apparatus at 550° C. to a constant weight; such treatment at 550° C. typically eliminates all organic matter, with the remaining material being primarily minerals (Standard Methods for the examination of dairy products, 17$^{th}$ edition (2004), American Public Health Association, Washington D.C.). The ash test was performed by using a Phoenix (CEM Microwave Furnace), which heated the samples at 550° C. for 30 min. The ash content was determined in wt. %. The mineral content (in wt. %) is generally similar to the ash content (wt. %), and thus the result of an ash test is used for quantification of the total mineral content in this disclosure.

Specific Ca, Mg, Na, and K contents were determined using a Perkin Elmer Atomic Absorption Spectrophotometer. Samples were treated with trichloroacetic acid to precipitate proteins and the filtrate was analyzed by the Atomic Absorption Spectrophotometer. Phosphorus content was determined via Inductively Coupled Plasma Spectrometry (official method of Analysis of AOAC, International 8$^{th}$ edition, methods 965.17 and 985.01). Chlorine content was determined by the official method of analysis of AOAC International 8th edition, methods 963.05, 972.27, and 986.26; AOAC International, Gaithersburg, Md. (2005). Titratable acidity (%) was determined in accordance with American Public Health Association method 15.021, 17th edition, Standard Method for the examination of dairy product.

Tables I-VIII summarize composition information relating to the preparation of yogurt products as described herein and illustrated in FIGS. 1-2. First, a raw or fresh milk product was separated into a skim milk product and cream. The respective compositions of the raw milk product, skim milk product, and cream are summarized in Table I. The skim milk product was subjected to ultrafiltration at a temperature of approximately 5° C. using a polymeric membrane system with a molecular weight cut-off of 10,000 Daltons, resulting in a yogurt base with higher protein and solids; the composition of this yogurt base (UF skim milk) at a 6.6-6.8 pH is summarized in Table I and detailed in Table II.

The UF skim milk yogurt base was pasteurized at 88-92° C. for 6-8 minutes, cooled to ~40° C., and then inoculated with 0.004-0.009 wt. % of a yogurt culture containing *Lactobacillus bulgaricus* and *Streptococcus thermophilus*, and fermented at a temperature of ~40° C. for 4-8 hours, at which time a pH of 4.4-4.6 was reached. After agitation and a thermization treatment at 55-60° C. for ~3 minutes, the fermented product was subjected to ultrafiltration at 45-55° C. using a ceramic membrane system with pore sizes of approximately 0.1 µm, resulting in a high protein, yogurt product (Skim Greek yogurt) with the composition summarized in Table I and detailed in Table VI. Substantially all (greater than 90 wt. %) of the acid whey was removed in the ceramic membrane ultrafiltration step, and the weight ratio of the yogurt product to acid whey in the fermented product was approximately 40:60. The composition of the acid whey (permeate) is detailed in Table IV.

In a separate experiment, the UF skim milk product (protein-enriched) was combined with cream, resulting in a yogurt base with higher protein, fat, and solids; the composition of this yogurt base (UF skim milk+cream) is summarized in Table I and detailed in Table III. The UF skim milk+cream yogurt base was then processed in a manner similar to the UF skim milk yogurt base, described above. The resultant fermented product was subjected to ultrafiltration using a ceramic membrane system, resulting in a high protein, yogurt product (Whole Greek yogurt) with the composition summarized in Table I and detailed in Table VII. Substantially all (greater than 90 wt. %) of the acid whey was removed in the ultrafiltration step, and the weight ratio of the yogurt product to acid whey in the fermented product was approximately 50:50. The composition of the acid whey (permeate) is detailed in Table V.

Constructive examples that demonstrate an unexpected benefit of the disclosed methods are summarized in Table VIII, in which yogurt bases having different protein contents are listed (A=3.2 wt. %, B=4.46 wt. %, C=5 wt. %, D=6 wt. %). To produce a Greek-style yogurt product having a target or nominal 10 wt. % protein content, the estimated amount of acid whey (in kg) that would be produced per 100 kg of the yogurt product is listed in Table VIII for each yogurt base (and yogurt base protein content). Advantageously, increasing the protein content of the yogurt base can dramatically decrease the amount of acid whey that is produced, and that must be disposed of. Note that an increase in yogurt base protein content from 3.2 to 5 wt. % (or from 4.46 to 6 wt. %) can reduce the amount of the acid whey by-product by 50%.

TABLE 1

Compositional Summary.

| Product | Fat Wt. % | Protein Wt. % | Lactose Wt. % | Minerals Wt. % | Solids Wt. % | Titratable acidity (%) |
|---|---|---|---|---|---|---|
| Raw milk | 3.5 | 3.2 | 4.8 | 0.70 | 12.2 | 0.12 |
| Skim milk | 0.07 | 3.3 | 4.9 | 0.75 | 8.9 | 0.13 |
| Cream | 44.0 | 1.9 | 2.5 | 0.40 | 48.8 | 0.05 |
| UF skim milk | 0.17 | 4.2 | 4.6 | 0.96 | 10.1 | 0.11 |
| UF skim milk + cream | 2.14 | 4.8 | 4.3 | 1.04 | 12.2 | 0.12 |
| Whole Greek yogurt | 4.46 | 8.3 | 1.5 | 1.07 | 16.0 | 1.09 |
| Skim Greek yogurt | 0.28 | 9.6 | 1.7 | 1.28 | 13.8 | 1.12 |

TABLE II

UF skim milk base-detailed composition.

| Component | Result | Method reference |
|---|---|---|
| Fat (wt. %) | 0.17 | AOAC 989.05 |
| Protein (wt. %) | 4.15 | AOAC 992.23 |
| Lactose (wt. %) | 4.57 | AOAC 980.13 |
| Total solids (wt. %) | 10.05 | SMEDP 15.10 C |
| Chloride (wt. %) | 0.10 | AOAC 980.25 |
| Titratable acidity (%) | 0.11 | |
| Calcium (per 100 g) | 133 mg | AOAC 984.27 |
| Magnesium (per 100 g) | 12.3 mg | AOAC 984.27 |
| Phosphorus (per 100 g) | 94.0 mg | AOAC 984.27 |
| Potassium (per 100 g) | 151 mg | AOAC 984.27 |
| Sodium (per 100 g) | 41.5 mg | AOAC 984.27 |
| Zinc (per 100 g) | 0.44 mg | AOAC 984.27 |
| Calcium/protein | 0.032 | |
| Phosphorus/protein | 0.023 | |

TABLE III

UF skim milk + cream base-detailed composition.

| Component | Result | Method reference |
|---|---|---|
| Fat (wt. %) | 2.14 | AOAC 989.05 |
| Protein (wt. %) | 4.78 | AOAC 992.23 |
| Lactose (wt. %) | 4.31 | AOAC 980.13 |
| Total solids (wt. %) | 12.24 | SMEDP 15.10 C |
| Chloride (wt. %) | 0.09 | AOAC 980.25 |
| Titratable acidity (%) | 0.12 | |
| Calcium (per 100 g) | 140 mg | AOAC 984.27 |
| Magnesium (per 100 g) | 12.5 mg | AOAC 984.27 |
| Phosphorus (per 100 g) | 97.7 mg | AOAC 984.27 |
| Potassium (per 100 g) | 144 mg | AOAC 984.27 |
| Sodium (per 100 g) | 38.9 mg | AOAC 984.27 |
| Zinc (per 100 g) | 0.50 mg | AOAC 984.27 |
| Calcium/protein | 0.029 | |
| Phosphorus/protein | 0.020 | |

TABLE IV

Acid whey (permeate) of Skim Greek yogurt-detailed composition.

| Component | Result | Method reference |
|---|---|---|
| Fat (wt. %) | 0.05 | AOAC 989.05 |
| Protein (wt. %) | 0.38 | AOAC 992.23 |
| Lactose (wt. %) | 3.76 | AOAC 980.13 |
| Total solids (wt. %) | 6.16 | USDA918 RL |
| Chloride (wt. %) | 0.11 | AOAC 980.25 |
| Titratable acidity (%) | 0.12 | |
| Calcium (per 100 g) | 140 mg | AOAC 984.27 |
| Magnesium (per 100 g) | 13.1 mg | AOAC 984.27 |
| Phosphorus (per 100 g) | 82.7 mg | AOAC 984.27 |
| Potassium (per 100 g) | 171 mg | AOAC 984.27 |
| Sodium (per 100 g) | 46.3 mg | AOAC 984.27 |
| Zinc (per 100 g) | 0.41 mg | AOAC 984.27 |
| As (wt. %) | 0.83 | AOAC 945.46 |

TABLE V

Acid whey (permeate) of Whole Greek yogurt-detailed composition.

| Component | Result | Method reference |
|---|---|---|
| Fat (wt. %) | 0.01 | AOAC 989.05 |
| Protein (wt. %) | 0.38 | AOAC 992.23 |
| Lactose (wt. %) | 3.62 | AOAC 980.13 |
| Total solids (wt. %) | 5.95 | USDA918 RL |
| Chloride (wt. %) | 0.09 | AOAC 980.25 |
| Titratable acidity (%) | 0.12 | |
| Calcium (per 100 g) | 153 mg | AOAC 984.27 |
| Magnesium (per 100 g) | 12.5 mg | AOAC 984.27 |
| Phosphorus (per 100 g) | 79.6 mg | AOAC 984.27 |
| Potassium (per 100 g) | 174 mg | AOAC 984.27 |
| Sodium (per 100 g) | 44.3 mg | AOAC 984.27 |
| Zinc (per 100 g) | 0.37 mg | AOAC 984.27 |

TABLE VI

Skim Greek yogurt-detailed composition.

| Component | Result | Method reference |
|---|---|---|
| Fat (wt. %) | 0.28 | AOAC 989.05 |
| Protein (wt. %) | 9.57 | AOAC 992.23 |
| Lactose (wt. %) | 1.68 | AOAC 980.13 |
| Total solids (wt. %) | 13.81 | USDA918 RL |
| Titratable acidity (%) | 1.12 | |
| Calcium (per 100 g) | 95.9 mg | AOAC 984.27 |
| Magnesium (per 100 g) | 9.69 mg | AOAC 984.27 |
| Potassium (per 100 g) | 116 mg | AOAC 984.27 |
| Sodium (per 100 g) | 32.5 mg | AOAC 984.27 |
| Lactic acid bacteria | 2.4 billion per gram | |
| Calcium/protein | 0.010 | |

TABLE VII

Whole Greek yogurt-detailed composition.

| Component | Result | Method reference |
|---|---|---|
| Fat (wt. %) | 4.46 | AOAC 989.05 |
| Protein (wt. %) | 8.25 | AOAC 992.23 |
| Lactose (wt. %) | 1.52 | AOAC 980.13 |
| Total solids (wt. %) | 16.02 | USDA918 RL |
| Titratable acidity (%) | 1.09 | |
| Calcium (per 100 g) | 90.6 mg | AOAC 984.27 |
| Magnesium (per 100 g) | 8.64 mg | AOAC 984.27 |
| Potassium (per 100 g) | 100 mg | AOAC 984.27 |
| Sodium (per 100 g) | 30.7 mg | AOAC 984.27 |
| Lactic acid bacteria | 1.7 billion per gram | |
| Calcium/protein | 0.011 | |

TABLE VIII

| | Acid Whey Production. | | | |
|---|---|---|---|---|
| Attribute | Yogurt Base A | Yogurt Base B | Yogurt Base C | Yogurt Base D |
| Yogurt Base Protein (wt. %) | 3.2 | 4.46 | 5 | 6 |
| Target Yogurt Product Protein (wt. %) | 10 | 10 | 10 | 10 |
| Acid whey (in kg) per 100 kg of Yogurt Product | 220 | 140 | 100 | 67 |

We claim:

1. A method for making a yogurt product, the method comprising:
   (a) concentrating a skim milk product to produce a protein-enriched milk fraction containing from about 3.5 to about 6 wt. % protein; wherein concentrating the skim milk product comprises ultrafiltering the skim milk product, microfiltering the skim milk product, nanofiltering the skim milk product, or subjecting the skim milk product to reverse osmosis;
   (b) combining the protein-enriched milk fraction with an additional milk fraction comprising cream and/or skim milk to produce a standardized yogurt base containing from about 3.5 to about 6 wt. % protein;
   (c) inoculating the standardized yogurt base with a yogurt culture and fermenting the inoculated yogurt base to produce a fermented product; and
   (d) removing at least a portion of acid whey from the fermented product to form the yogurt product.

2. The method of claim 1, wherein the additional milk fraction comprises cream.

3. The method of claim 2, wherein concentrating the skim milk product comprises ultrafiltering the skim milk product.

4. The method of claim 2, wherein concentrating the skim milk product comprises microfiltering the skim milk product.

5. The method of claim 2, wherein concentrating the skim milk product comprises nanofiltering the skim milk product or subjecting the skim milk product to reverse osmosis.

6. The method of claim 2, wherein removing in step (d) comprises ultrafiltering the fermented product.

7. The method of claim 2, wherein removing in step (d) comprises microfiltering the fermented product or nanofiltering the fermented product.

8. The method of claim 2, wherein the standardized yogurt base contains:
   from about 3.8 to about 5.5 wt. % protein;
   from about 1100 to about 1800 ppm calcium; and
   from about 800 to about 1200 ppm phosphorus.

9. The method of claim 2, further comprising:
   pasteurizing the standardized yogurt base between step (b) and step (c); and
   combining the yogurt product in step (d) with an ingredient and packaging in a container.

10. The method of claim 1, wherein the additional milk fraction comprises skim milk.

11. The method of claim 10, wherein concentrating the skim milk product in step (a) comprises ultrafiltering the skim milk product.

12. The method of claim 10, wherein concentrating the skim milk product in step (a) comprises microfiltering the skim milk product.

13. The method of claim 10, wherein concentrating the skim milk product in step (a) comprises nanofiltering the skim milk product or subjecting the skim milk product to reverse osmosis.

14. The method of claim 10, wherein removing in step (d) comprises ultrafiltering the fermented product.

15. The method of claim 10, wherein removing in step (d) comprises microfiltering the fermented product or nanofiltering the fermented product.

16. The method of claim 10, wherein the standardized yogurt base contains:
   from about 3.8 to about 5.5 wt. % protein;
   from about 1100 to about 1800 ppm calcium; and
   from about 800 to about 1200 ppm phosphorus.

17. The method of claim 10, further comprising:
   pasteurizing the standardized yogurt base between step (b) and step (c); and
   combining the yogurt product in step (d) with an ingredient and packaging in a container.

18. A method for making a yogurt product, the method comprising:
   (i) concentrating a skim milk product to produce a standardized yogurt base containing from about 3.5 to about 6 wt. % protein and characterized by a weight ratio of calcium to protein in a range from about 0.02 to about 0.04 and a weight ratio of phosphorus to protein in a range from about 0.013 to about 0.033; wherein concentrating the skim milk product comprises ultrafiltering the skim milk product or microfiltering the skim milk product;
   (ii) inoculating the standardized yogurt base with a yogurt culture and fermenting the inoculated yogurt base to produce a fermented product; and
   (iii) removing at least a portion of acid whey from the fermented product to form the yogurt product.

19. The method of claim 18, wherein the standardized yogurt base contains from about 1100 to about 1800 ppm calcium.

20. The method of claim 18, wherein the standardized yogurt base contains from about 800 to about 1200 ppm phosphorus.

21. The method of claim 18, wherein removing in step (iii) comprises ultrafiltering the fermented product, microfiltering the fermented product, or nanofiltering the fermented product.

22. The method of claim 18, wherein:
   the yogurt product contains
      from about 7 to about 25 wt. % protein;
      from about 0.5 to about 3 wt. % lactose; and
      from about 10 to about 30 wt. % solids; and
   the yogurt product is characterized by a weight ratio of protein:lactose of greater than or equal to about 4:1.

23. The method of claim 1, wherein:
   concentrating in step (a) is performed at a temperature in a range from about 3 to about 15° C.; and
   removing in step (d) is performed at a temperature in a range from about 35 to about 55° C.

24. The method of claim 1, wherein removing in step (d) comprises filtering the fermented product using a ceramic membrane system having pore sizes of less than or equal to 0.1 μm.

25. The method of claim 1, wherein the standardized yogurt base has:
   a solids content from about 9.5 to about 15 wt. %;
   a weight ratio of calcium to protein from about 0.02 to about 0.04; and a weight ratio of phosphorus to protein from about 0.013 to about 0.033.

26. The method of claim 1, wherein the yogurt product contains:
from about 7 to about 25 wt. % protein;
from about 0.5 to about 3 wt. % lactose; and
from about 10 to about 30 wt. % solids.

27. The method of claim 1, wherein the yogurt product is characterized by a weight ratio of protein:lactose of greater than or equal to about 4:1.

28. The method of claim 18, wherein:
concentrating in step (i) is performed at a temperature in a range from about 3 to about 15° C.; and
removing in step (iii) is performed at a temperature in a range from about 35 to about 55° C.

29. The method of claim 18, wherein removing in step (iii) comprises filtering the fermented product using a ceramic membrane system having pore sizes of less than or equal to 0.1 μm.

30. The method of claim 18, wherein the standardized yogurt base has a solids content from about 9.5 to about 15 wt. %.

31. The method of claim 18, wherein the yogurt product contains:
from about 7 to about 25 wt. % protein;
from about 0.5 to about 3 wt. % lactose; and
from about 10 to about 30 wt. % solids.

32. The method of claim 18, wherein the yogurt product is characterized by a weight ratio of protein:lactose of greater than or equal to about 4:1.

* * * * *